United States Patent
Darlington, Jr. et al.

(10) Patent No.: US 7,022,398 B2
(45) Date of Patent: Apr. 4, 2006

(54) MOISTURE-IMPERVIOUS WATER-SWELLABLE CLAY-CONTAINING "WATER-STOP" COMPOSITION CONTAINING A WATER-PENETRABLE COATING

(75) Inventors: Jerald W. Darlington, Jr., Marengo, IL (US); Robert J. Trauger, Cary, IL (US); Natalie A. Dotlich, Buffalo Grove, IL (US)

(73) Assignee: Amcol International Corporation, Arlington Heights, IL (US)

( * ) Notice: Subject to any disclaimer, the term of this patent is extended or adjusted under 35 U.S.C. 154(b) by 341 days.

(21) Appl. No.: 10/666,016

(22) Filed: Sep. 18, 2003

(65) Prior Publication Data
US 2005/0065261 A1    Mar. 24, 2005

(51) Int. Cl.
| | |
|---|---|
| *B28B 3/20* | (2006.01) |
| *B28C 7/16* | (2006.01) |
| *B29C 47/06* | (2006.01) |
| *B32B 19/02* | (2006.01) |
| *B32B 33/00* | (2006.01) |

(52) U.S. Cl. ............ 428/150; 106/426; 524/445; 524/556
(58) Field of Classification Search ........ 106/426; 524/445, 556; 428/150
See application file for complete search history.

(56) References Cited

U.S. PATENT DOCUMENTS

| | | | |
|---|---|---|---|
| 4,534,926 A * | 8/1985 | Harriett ............... 264/281 |
| 4,656,062 A | 4/1987 | Harriett | |
| 4,668,724 A | 5/1987 | Harriett | |
| 4,733,989 A | 3/1988 | Harriett | |
| 4,787,780 A | 11/1988 | Harriett | |
| 4,810,573 A | 3/1989 | Harriett | |
| 5,053,265 A | 10/1991 | Alexander | |
| 5,063,100 A | 11/1991 | Alexander | |
| 5,180,255 A | 1/1993 | Alexander | |
| 5,552,469 A * | 9/1996 | Beall et al. ............ 524/445 |
| 5,580,630 A | 12/1996 | Byrd | |
| 6,417,262 B1 * | 7/2002 | Turner et al. .......... 524/445 |
| 6,486,254 B1 * | 11/2002 | Barbee et al. ........... 524/445 |
| 6,610,793 B1 * | 8/2003 | Soerens et al. .......... 525/404 |
| 2003/0099815 A1 | 5/2003 | Dontula et al. | |

FOREIGN PATENT DOCUMENTS

EP          1 134 258 A1     9/2001

* cited by examiner

*Primary Examiner*—Kelechi C. Egwim
(74) *Attorney, Agent, or Firm*—Marshall, Gerstein & Borun LLP (57) ABSTRACT

A waterproofing article in the form of rod-, or rope-shaped clay-containing compositions, and a method of waterproofing using the article, whereby a water-penetrable, degradable, or water-soluble film or coating forms an outer surface of the article for avoiding premature hydration of an underlying clay-containing composition. In the preferred embodiment, an inner core of a water-swellable clay-containing composition includes a coating of a water-removable or degradable material, completely encasing the major outer surfaces of the composition, having controlled, predetermined water-penetration; high pH degradability; or water-solubility so that the core of water-swellable clay-containing composition is quickly hydrated after water-penetration of the coating material, and to prevent clay hydration during installation, prior to water-penetration of the coating material.

27 Claims, 3 Drawing Sheets

MOISTURE-IMPERVIOUS WATER-SWELLABLE CLAY-CONTAINING "WATER-STOP" COMPOSITION CONTAINING A WATER-PENETRABLE COATING

FIELD OF THE INVENTION

The present invention is directed to a method of forming a co-extruded "water-stop" water-swellable clay-containing composition capable of swelling upon hydration, after installation and contact with water. In order to prevent premature hydration of the composition, the composition is coated, preferably via co-extrusion, with a desired thickness of a slowly water-penetrable coating material, such as a biodegradable polymer or a water-soluble polymer. The outer coating material is applied in a desired thickness, depending upon its wetting rate, so that the underlying water-swellable clay-containing composition will not be hydrated during installation of the composition, such as by contact with rainwater. In one embodiment of the present invention, the water-swellable clay-containing composition and a separate, water-penetrable or slowly water-soluble coating material are co-extruded with the coating material over the underlying water-swellable clay-containing composition.

BACKGROUND OF THE INVENTION AND PRIOR ART

This Assignee's Harriett U.S. Pat. Nos. 4,656,062; 4,810,573; 4,733,989; 4,787,780; 4,668,724; and 4,534,926; all hereby incorporated by reference, disclose the preferred composition core material of the coated articles manufactured in accordance with the present invention. In accordance with the Harriett patents, a sheet of release paper is applied over the bentonite clay/elastomer or polypropene or polybutene compositions described in this Assignee's aforementioned patents to prevent the waterproofing materials from adhering to themselves during manufacture, handling and installation, or when the materials are manufactured in roll form. The release paper, however, does not protect the water-swellable composition from premature hydration, e.g., by rainwater, prior to installing the composition in an area of potential water flow.

The rod-, or rope-shaped water-swellable clay compositions described herein generally are manually placed between two separately poured concrete sections, during construction. The clay composition is disposed in contact with a cured concrete section prior to pouring an adjacent concrete section such that the composition is disposed between and in contact with the two concrete sections. By this placement, the rod- or rope-shaped clay composition, when swelled by water, expands to profile the adjacent concrete section surfaces to fill any concrete voids and unfilled areas to prevent water penetration between the adjacent concrete sections. Concrete construction projects are not normally perfectly timed such that immediately after one concrete section is poured and cured, e.g., a concrete footing, there is just enough time to position the subject rod- or rope-shaped clay composition prior to pouring an adjacent concrete section in contact with the intermediate clay composition. Instead, normally there are days or weeks between concrete pours leaving time for rainwater to contact the clay composition disposed in contact with the cured concrete section prior to pouring the adjacent concrete section.

The co-extruded covering materials, described herein, are disposed to encase the water-swellable clay composition in order to prevent the clay composition from swelling prior to pouring an adjacent concrete section over the cured concrete section on which the rod- or rope-shaped clay composition is disposed. The co-extruded covering material prevents the clay composition from premature swelling to an extent that the clay composition expands and becomes misaligned, or would be squeezed out from between the adjacent concrete section due to its premature expansion.

In accordance with this Assignee's Byrd U.S. Pat. No. 5,580,630, a coating of a water-soluble polymer, preferably polyvinyl alcohol, having immediate water-solubility, is applied onto an adhesive side of sheet-form waterproofing articles to allow the sticky material to be rolled upon itself for storage and transportation. The water-soluble polymer quickly dissolves upon contact with water so that the adhesive composition can be bonded to a substrate surface.

While water-soluble polymers have been used over water-swellable clay compositions in sheet form (Byrd '630), and over water-permeable facing sheet materials, having apertures therein, for preventing premature hydration of a water-swellable clay layer thereunder, as disclosed in this Assignee's Alexander U.S. Pat. Nos. 5,053,265; 5,063,100 and 5,180,255, hereby incorporated by reference, the water-penetrable or water-soluble polymer coating layers have not been co-extruded over or otherwise applied over rod-shaped or rope-shaped water-swellable clay-containing materials.

SUMMARY OF THE INVENTION

In brief, the present invention is directed to a waterproofing article in the form of rod-, or rope-shaped water-swellable clay-containing compositions, and a method of waterproofing using the article, whereby a water-penetrable or water-soluble film or coating forms an outer surface of the article for avoiding premature hydration of an underlying water-swellable clay-containing composition. In the preferred embodiment, the outer core of the water-swellable clay-containing composition includes a coating of a water-interacting material, completely encasing the composition, having controlled, predetermined water-penetrability or water-solubility so that the core of water-swellable clay-containing composition is quickly hydrated after a predetermined period of time required for water-penetration or solubilization and removal of the coating material, and to prevent clay hydration during installation, prior to removal of the coating material.

Accordingly, one aspect of the present invention is to provide a new and improved waterproofing article, and method, that includes an outer layer of a water-penetrable or water-soluble coating for delayed hydration of an inner water-swellable clay composition.

Another aspect of the present invention is to provide a new and improved waterproofing article, and method, that includes an outer layer of a water-soluble or biodegradable polymer.

Still another aspect of the present invention is to provide a new and improved waterproofing article, and method, that includes an inner core of a composition containing a water-swellable clay, and an outer coating of a biodegradable polymeric film that is essentially water-insoluble when contacting a material having a pH below about 9, but when in contact with a material having a pH at 9 or above, particularly 10–14, such as uncured or freshly poured concrete, the polymeric film degrades to permit water-penetration.

A further object of the present invention is to provide a new and improved water barrier and method of manufacturing the water barrier, including a water-impermeable core composition containing a water-swellable colloidal clay, such as sodium bentonite or sodium montmorillonite clay, coated with a layer of material having a predetermined rate of water-permeability or water-solubility, in a desired thickness, so that water cannot penetrate the coating material to contact the water-swellable clay-containing composition until after removal or water-penetration of the coating material by water-solubilization, water-penetration or coating degradation.

These and other aspects, features, and advantages of the present invention will be apparent to those of ordinary skill in the art in view of the detailed description of the preferred embodiments, which is made with reference to the drawings, a brief description of which is provided below.

DETAILED DESCRIPTION OF THE PREFERRED EMBODIMENT

The present invention may be understood more readily by reference to the following detailed description of the invention and the examples provided therein. It is to be understood that this invention is not limited to the specific components, articles, processes and/or conditions described, as these may, of course, vary. It is also to be understood that the terminology used herein is for the purpose of describing particular embodiments only and is not intended to be limiting.

Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

"Polypropene" as used herein is a polymer having a structural formula $(C_3H_6)_n$, where n ranges from about 7 to about 60, having a weight average molecular weight from about 300 to about 2,500.

"Polybutene" as used herein is a polymer having a structural formula $(C_4H_8)_n$, where n ranges from about 6 to about 45, having a weight average molecular weight in the range of bout 300 to about 2,500, and includes polyisobutylene.

In accordance with the preferred embodiment of the present invention, the water-proofing article 10 includes a core of a water-swellable clay-containing composition 22, preferably a water-swellable clay intimately mixed with a polypropene, a polybutene or a mixture of polypropene and polybutene, and optionally an elastomer, to provide a composition having an excellent capacity for swelling upon contact with water. Preferably, a water-swellable clay, for example, sodium bentonite, is included in the composition in an amount of about 10% to about 90% by total weight of the composition, and polypropene and/or polybutene is included in the clay composition in an amount of about 8% to about 65% by weight of the composition, and optionally an elastomer, such as butyl rubber, in an amount of about 1–20% by weight.

To achieve the full advantage of the preferred embodiment of the present invention, the composition 22 should include polypropene, polybutene or mixtures thereof in an amount of at least about 8% by weight. Additional tackifiers compatible with the polypropenes or polybutenes may be included for additional tack so long as the polypropene, polybutene or mixture is included in at least about 8% by weight of the composition. Additional compatible tackifiers may include, for example, aliphatic petroleum hydrocarbon resins, such as polyterpenes, hydrogenated resins, and mixed olefins. Generally, aromatic tackifiers are not suitable since they will bleed to the surface of the composition and separate, thereby reducing the handleability and consistency of the composition. Other additives, such as viscosity controlling agents, fillers, tackifiers and the like may be added in a total amount up to about 20% by weight of the adhesive composition to impart any desired physical characteristics to the clay composition.

The water-swellable clay utilized in the multi-layered articles of the present invention can be any water-swellable clay which will swell upon contact with water, i.e., will swell in the presence of water. Preferably, the clay is a montmorillonite clay such as calcium montmorillonite and/or a calcium bentonite or sodium montmorillonite or sodium bentonite, or combinations thereof. A preferred clay is sodium montmorillonite or sodium bentonite which are basically hydratable montmorillonite clays of the type generally found in the Black Hills region of South Dakota and Wyoming. These clays have sodium as a predominant exchange cation. However, the bentonite utilized in accordance with this embodiment of the present invention may also contain other predominant cations such as magnesium or iron. There are cases wherein a montmorillonite predominant in calcium ions can be converted to a high swelling sodium variety through a well known process called "peptizing". The clay utilized in this invention may be one or more peptized montmorillonites or peptized bentonites. The clay may also be any member of the dioctahedral or trioctahedral smectite group or mixtures thereof. Examples are Beidellite, Nontronite, Hectorite and Saponite. The clay, i.e., bentonite, generally is finely divided as known for use in water barrier panels and the like, i.e., 150 to 350 mesh, or smaller for faster water-swelling, e.g., 200 mesh to 425 mesh. The preferred clay particle size distribution includes at least 80 percent by weight particles within the range of 30 μm to 75 μm and less that 20% by weight of the particles have a size smaller than 30 μm.

The polybutenes, e.g., polyisobutylene, forming part of the preferred water-swellable clay composition embodiment of the present invention, generally comprise $(C_4H_8)_n$, where n ranges from about 6 to about 45, having average molecular weights in the range of about 300 to about 2,500. The commercially available useful polybutenes are predominantly of high molecular weight mono-olefins and can include 100% of the polybutene or include up to about 10% isoparaffins. The polybutenes are chemically stable, permanently fluid liquids and their tackiness increases with increased molecular weight. The viscosities of the polybutenes range from a consistency of a light oil to a highly viscous fluid having a viscosity range of about 25 to about 4,000 centipoises. The lower viscosity polybutenes can be combined with a water-swellable clay to provide a composition having a soupy consistency which is very tacky and difficult to handle depending upon the quantity of water-swellable clay included within the clay composition of the multi-layer articles of the present invention.

The polypropenes forming part of the preferred water-swellable clay composition generally comprise $(C_3H_6)_n$, where n ranges from about 7 to about 60 having molecular weights in the range of about 300 to about 2,500. The commercially available polypropenes useful in the preferred clay composition generally are amorphous in character and may be combined with up to about 10% by weight of a suitable processing solvent, such as ligroin, although the polypropenes may be blended with the bentonite easily at elevated temperatures, i.e., 200° C. without a solvent.

To achieve the greatest swelling of the preferred compositions of the present invention, the polypropene or polybutene or mixtures should be present in the composition in an amount of about 10% to about 30% by weight of the total composition, preferably about 10% to about 20% by weight of the total composition.

The addition of an optional elastomer in an amount of about 1% to about 20%, preferably about 1% to about 10%, based on the total weight of the water-swellable clay composition will substantially increase the handleability of the composition without impeding its swellability. To achieve the full advantage of this embodiment of the present invention, the elastomer should be included in an amount of about 2% to about 10% based on the total weight of the clay composition. Mastication or shearing, i.e., in a sigma blender or twin screw extruder, of a water-swellable clay composition containing a water-swellable clay, such as bentonite, together with polypropene and/or polybutene, and an elastomer, increases the capacity of the composition to swell in an amount greater than the water-swellable clay alone, and greater than the water-swellable clay, polypropene/polybutene composition without the elastomer.

Figure 1:
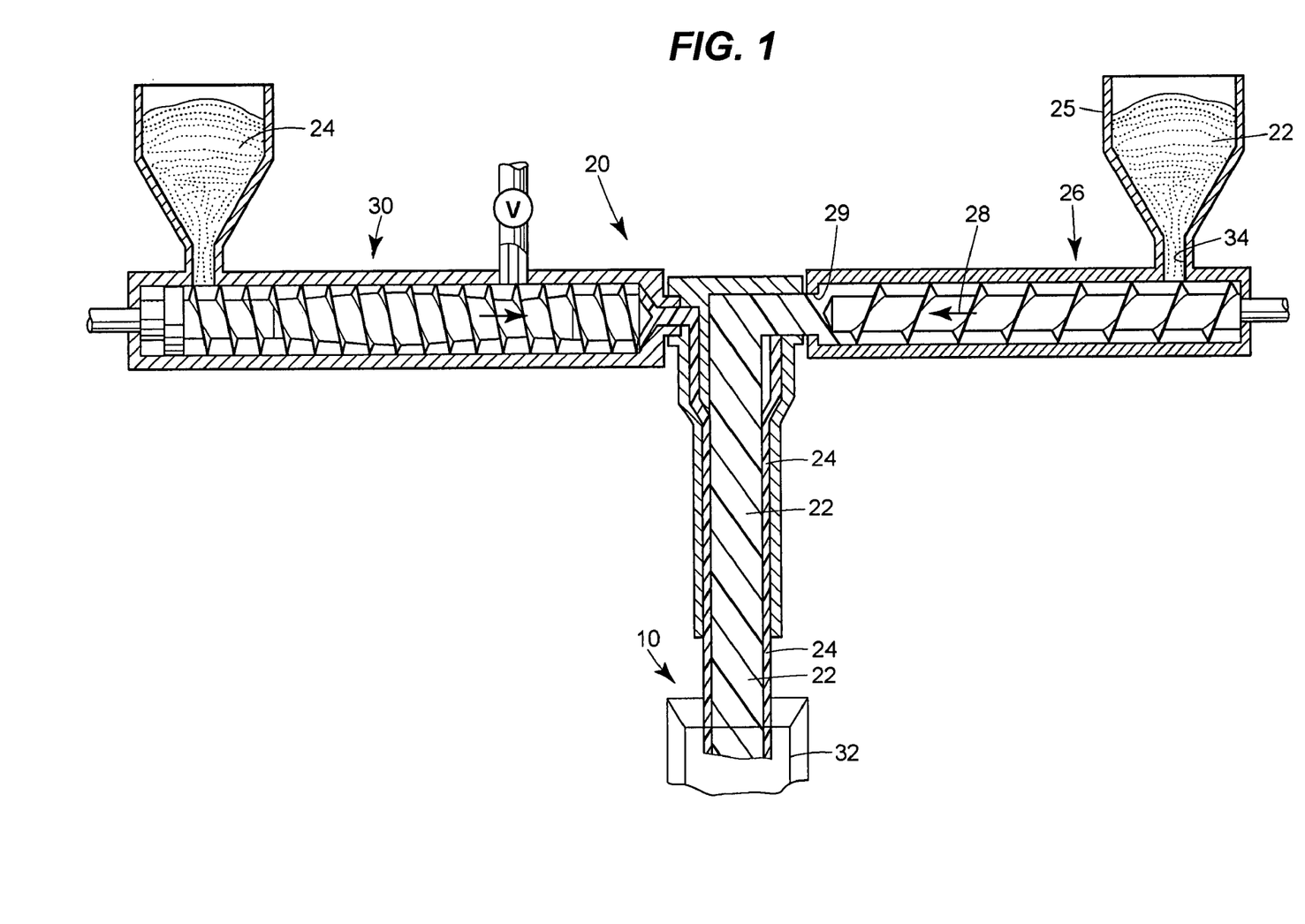
FIG. 1 is a cross-sectional view of a co-extrusion apparatus useful for co-extruding the waterproofing articles of the present invention.

In accordance with another important feature of the present invention, the polybutene and/or polypropene, together with any organic solvent that may be included in the composition, are intercalated between clay platelets during shearing to form an intercalated clay, including clay tactoids having 20 or less stacked clay platelets, and individual exfoliated clay platelets surrounded by the polybutene and/or polypropene. Sufficient shear is imparted to the composition to achieve intercalation of the polybutene and/or polypropene, and at least partial exfoliation of the clay platelets, such as by mixing in a sigma blender or by auger extrusion, as shown in FIG. 1.

Essentially any elastomer, preferably having at least 100% elongation and, more preferably having at least 500% elongation, can be used in the water-swellable clay composition of the present invention to substantially improve the handleability, cohesiveness and structural integrity of the water-swellable clay composition and multi-layered articles manufactured. Partially cross-linked elastomers have been found to be most suitable in improving the consistency, handleability and structural integrity of articles requiring such properties, but elastomers which are not cross-linked are also useful, particularly those polymers which are capable of being lightly cross-linked when subjected to the heat generated within the blender or extruder during mastication and mixing with the other clay composition components. Fully cross-linked elastomers generally are not suitable for incorporation into the clay composition of the present invention since their elongation capacity is insufficient to permit full expansion of the water-swellable clay during hydration. However, any elastomer having at least 100% elongation is suitable as a component of the water-swellable clay composition of the multi-layered articles described herein, and included within the scope of the present invention.

Suitable elastomers for incorporation into the preferred clay composition include butyl rubber, halogenated butyl rubber, styrene-butadiene, synthetic and natural rubbers, ethylene-propylene copolymers and terpolymers, and partially cross-linked butyl rubbers having divinylbenzene added to form a terpolymer for the purpose of imparting a degree of "cure". The elastomer can be shredded prior to mastication with the water-swellable clay and polypropenes and/or polybutenes to decrease mixing time, although shredding is not necessary. Mastication and homogeneous flow of the elastomer throughout the water-swellable clay composition can be achieved with the elastomer in any desired shape, i.e., pellet form, for example in a sigma blender.

An elastomer having an elongation of at least 100% preferably is included in the clay composition to permit the water-swellable clay to substantially completely expand upon water contact so long as the elastomer includes a plasticizer in an amount of at least 2% based on the total weight of the clay composition. The elastomer provides exceptionally good structural integrity to the clay composition without substantially inhibiting the swellability of the clay. Preferably, the elastomers should be partially, but not completely, cross-linked.

The preferred water-swellable clay composition includes a water-swellable clay, such as sodium bentonite, in an amount of 10–90% by weight, polypropene and/or polybutene in an amount of about 8% to about 65% by weight, and an elastomer in an amount of 1–20% by weight, and optionally any plasticizer compatible with the elastomer and capable of plasticizing the elastomer, in an amount of 2–50% by weight based on the total weight of the clay composition. The plasticizer improves the workability of the elastomer, extends the elastomer, enables the elastomer to reposition itself with expansion of the water-swellable clay, when the clay is wetted, and wets the water-swellable clay surface sufficiently to enable the elastomer to accept substantial amounts of the water-swellable clay (up to about 90%) and to provide a homogeneous clay distribution throughout the elastomer in the clay composition.

Suitable plasticizers, optionally added together with any added elastomer, are the relatively low polarity plasticizers including epoxidized oils, such as epoxidized soybean oil; alkyl monoesters such as butyl oleate; long chain partial ether esters, such as butyl cellosolve oleate; long chain alkyl diesters, such as dioctyl adipate and dioctylphthalate; and petroleum-derived plasticizers such as aromatic-napthenic oils; napthenic-aromatic oils, napthenic-paraffinic oils; and paraffinic oil.

To achieve the full advantage of this clay/plasticizer embodiment for the clay composition, the plasticizer should be included in the clay composition in an amount of at least about 10% by weight of the composition to plasticize the elastomer and fully wet-out the bentonite. The plasticizers generally are included in an amount of about 10% to about 30% by total weight of the clay composition.

As shown in the drawings, the water-swellable clay-containing core material 22 is overcoated with a co-extruded layer of a water-penetrable, water-soluble, or degradable coating layer 24 to produce the product 10.

In accordance with one important embodiment of the present invention, the outer coating material 24 is a water-penetrable material, such as a non-swelling clay mixed with polypropene and/or polybutene, in proportions described above with reference to the water-swelling clay-containing core material 22, with or without an elastomeric material, such as butyl rubber, and/or a plasticizer for the elastomer, again in proportions described above with reference to the core material 22. Suitable non-water-swellable clays include the kaolinites, attapulgites, micas, talc, and other non-water-swellable clays. If a sodium or calcium or magnesium montmorillonite clay is included in the outer coating layer

24, it should be present in an amount less than about 10% by weight to allow for water-penetration through the coating layer 24.

In accordance with a preferred embodiment of the present invention, the preferred coating material is a polyacrylic acid or a polyacrylate or a poly (methacrylic acid) or polymethacrylate. In accordance with another embodiment, the coating material is a biodegradable polymer, such as EASTAR B10 Copolyester 14766 from Eastman Chemical Company, Kingsport, Tenn., which is poly(tetramethylene adipate-co-terephthalate). While a film or layer of this material has a negligible solubility in water, it has been found that when in contact with a cement composition, or other materials having a pH of about 9 or above, the polyester will degrade rapidly to permit water-penetration to the underlying water-swellable clay-containing core material 22.

In accordance with another important embodiment of the present invention, the water-swellable clay-containing core material 22 is over coated with a layer of water-soluble polymer or a wax coating in a layer having a desired thickness corresponding to a desired period of water contact without water penetration. Suitable materials capable of sustaining a predetermined number of rainfalls, and the like, during installation and handling are easily removed upon sustained water contact, such as water in soil used for backfilling, after installation. Optionally, the coating layer 24 can be saturated with water after installation to remove the coating material, after a contact period, to ensure that the core material 22 is ready for immediate water contact and swelling. Some of the suitable coating materials include the following: Gums, such as guar, arabic, ghatti, tragacanth, agar, xanthan, karaya, locust bean, acacia, carrageenan, silicon gums, mixtures, and the like; modifiedcelluloses, such as hydroxyethylcellulose, hydroxypropylcellulose, hydroxybutylcellulose, carboxymethylcellulose, sodium carboxymethyl-cellulose, and the like; gelatin; starch; modified starches; nonionic surfactants of sufficient molecular weight and water solubility, (i.e., molecular weight of at least 600 and an HLB number of at least 8), such as nonoxynols, oxtoxynols, ethoxylated (or propoxylated) fatty alcohols, ethoxylated (or propoxylated) fatty acids or amides, ethoxylated (or propoxylated) fatty amines and dodoxynols, mixtures, and the like; polyacrylates, and their copolymers, cross-linked sufficiently for a desired water-solubility, e.g., weight average molecular weight of about 200 to about 100,000, such as polyacrylic acid, polyacrylamide, polyvinylpyrrolidones, polyvinylalcohols, polyethyleneimines, polyacrylonitrile, polymethylmeth-acrylate, and the like; glass phosphates; glassy silicates; EMA (ethylene maleic anhydride); SMA (styrene maleic anhydride); functionalized silicones; silicone polymers; waxes (together with an emulsifier), for example carnauba wax, beeswax, microcrystalline wax, and the like; polyhydric alcohols, such as glycerin, ethylene glycol, propylene glycol, sorbitol, polyglycols (such as triethylene glycol), and the like; fatty alcohols; and fatty amines. The above polymers should be lightly cross-linked (e.g., wt. av. molecular wt. of about 200 to about 100,000) to provide sufficient water-insolubility for removal over a desired sustained water contact.

One desirable coating material is a wax obtained from National Wax Company called FRESHLOK 195 having the following specifications:

| | |
|---|---|
| Congealing Point (ASTM D-938) | 142–148° F. |
| Needle Penetration at 77° F. (ASTM D-1321) | 6.0–9.0 |
| ASTM Color (ASTM D-1500) | 1.5 Max. |

| -continued | |
|---|---|
| Brookfield Viscosity (ASTM D-2669) | |
| at 300° F. | 105–125 cps |
| at 250° F. | 195–225 cps |
| at 240° F. | 225–255 cps |
| at 220° F. | 300–340 cp |
| at 200° F. | 420–470 cps |
| Suggested Application Temperature | 200–225° F. |
| Blocking Point | 130° F. |

This material, when co-extruded over the core material 22 will be completely removed upon immersion in water in different periods of time, depending upon the thickness applied, as shown in Table 1:

TABLE 1

| LBS. OF COATING PER 100 SQUARE FEET | DELAYED HYDRATION IN WEEKS |
|---|---|
| 1 | 0.1 |
| 2 | 0.3 |
| 3 | 0.5 |
| 4 | 0.9 |
| 5 | 2.1 |
| 6 | 3.0 |
| 7 | 4.0 |
| 8 | 4.8 |
| 9 | 5.9 |
| 10 | 6.1 |

The coating layer 24 is applied in any desired amount, depending upon how much water contact, e.g., number of rains, is anticipated during handling and installation. Other materials having more or less water solubility are coated, as layer 24, in whatever coating thickness is needed to achieve the desired delay in hydration of the inner water-swellable clay-containing core material 22.

Many water-soluble polymers are available, as described in WATER-SOLUBLE SYNTHETIC POLYMERS: PROPERTIES AND BEHAVIOR, Molyneux, Vols. I and II, CRC-Press, © 1983, hereby incorporated by reference, for use as coating materials 24 over the interior core material 22. In one embodiment of the present invention, the water-soluble polymer forming a layer or film coating 24 is poly(vinyl alcohol).

Since poly(vinyl alcohol) is manufactured from the hydrolysis of poly(vinyl acetate):

commercial polyvinyl alcohols always have a portion of unhydrolyzed poly(vinyl acetate) in the polymer. Above about 25 mol percent vinyl acetate, the polyvinyl alcohol becomes more difficultly solubilized, requiring hot water or more water contact time for complete solubility. Suitable commercial sources for water-soluble poly(vinyl alcohol) at various degrees of hydrolysis include: MONO-SOL water-soluble polyvinyl alcohol film of Chris Craft Industrial Products, Inc., Gary, Ind., e.g., cold water-soluble film M-7030; and ARMOR H-20 water-soluble films from Union Camp Corporation, Bag Division, Old Greenwich, Conn. Other suitable water-soluble polymers include the copolymers of vinyl alcohol and vinyl acetate, e.g., poly(vinyl acetate-co-vinyl alcohol):

Also known as partially hydrolyzed poly(vinylacetate) or partially acetylated poly(vinyl alcohol), available commercially from DuPont as ELVANOL and from Airco Chemical as VINOL.

Other suitable water-soluble polymers for use as the outer coating layer 24 include polyvinylpyrrolidone (PVP) having a monomeric structure as follows:

The water-solubility of PVP can be adjusted according to (1) the degree of hydrolysis of the polyvinylpyrrolidone to take into account different thicknesses of PVP films; and (2) by forming a metal salt of PVP, such as sodium or potassium. It is preferred that at least 50% of the PVP monomeric units are hydrolyzed to the structure:

and that the PVP be used in the salt form, e.g., sodium or potassium polyvinylpyrrolidone. Such PVP coatings provide immediate partial solubility of the polymer film when wetted. The molecular weight of the polyvinyl alcohol or PVP polymers is not critical so long as the polymer is water-soluble. Excellent results can be obtained with PVP having weight average molecular weights in the range of about 225 to about 1,000,000 or more, preferably about 2,000 to about 100,000.

Other PVP derivatives that are water-soluble include the following: N-Methylpyrrolidone (NMP); N-Ethylpyrrolidone (NEP); and N-Vinylpyrrolidone (NVP), having the structures:

NMP: R = $CH_3$
NEP: R = $CH_3CH_2$
NVP: R = $CH_2$:CH

Other substituted water-soluble pyrrolidones useful in accordance with the present invention include: N-isopropyl-5-methylpyrrolidone; pyrrolidone-N-acetic acid; N-cyclohexyl-pyrrolidone; and hexamethylene-bis(2-pyrrolidone). It appears that best results for polyvinylpyrrolidone and its derivatives are achieved when the PVP has about 80% to about 90% of its monomer units hydrolyzed.

Other water-soluble polymers useful as the outer coating layer 24 in the multi-layer articles of the present invention include poly(ethylene oxide) having monomer units:

$-[O-(CH_2)-(CH_2)]-$, hereinafter PEO; available as PLURACOL E from Wyandote, and POLYOX WSR or CARBOWAX from Union Carbide—water-soluble even at the very high molecular weights, e.g., 1,000,000 or more; poly (propylene oxide), having monomer units:

water-soluble only in the oligomer form, having weight average molecular weights from about 100 to about 1,000, preferably about 100 to about 500; poly(vinyl methyl ether), having monomer units:

and their hydrolysis product derivatives. Poly(vinyl methyl ether) is water-soluble and available commercially as GANTREZ M from GAF Corporation and is water-soluble, like PEO, at room temperature, at very high molecular weights, e.g., weight average molecular weights from about 120 to about 1,000,000 and more. Another suitable water-soluble polymer is polyoxymethylene (POM), having monomer units [O—$CH_2$], which are water-soluble in the very short oligomer form, i.e., poly(formaldehyde) and having a melting point of about 180° C., and weight average molecular weights from about 40 to about 400. Oxide copolymers also are suitable as the water-soluble coating material, including random and block copolymers of poly(ethylene oxide) with a variety of monomers, including propylene oxide and/or poly(propylene oxide). One particularly useful copolymer is sold as PLURONIC F68 having a poly(propylene oxide) core molecular weight of about 1,800 and including 80% w/w ethylene oxide units, giving a combined molecular weight for the two outer poly(ethylene oxide) sections of 6,600—for a combined weight average molecular weight of 8,400.

The non cross-linked and lightly cross-linked polyacrylic acid polymers are the preferred coating materials, having monomer units:

and are commercially available as CARBOPOL resins from B.F. Goodrich and PRIMAL resins from Rohm & Haas. Light cross-linking will slightly hinder the water-solubility for better adherence of the polymer to a substrate to be waterproofed.

Other, preferred water-soluble derivatives of polyacrylic acid, and substituted polyacrylic acid also are excellent coating materials in accordance with the present invention, such as poly(methacrylic acid), (PMAA), having a monomeric structure:

Similar water-soluble polymers that are suitable in accordance with the present invention include poly(methacrylamide), or PMAAm, having the general monomeric structure:

Poly(N,N-Dimethylacrylamide), having the general monomeric structure:

Poly(N-Isopropylacrylamide), or PIPAAm, having the monomeric structure:

Poly(N-acetamidoacrylamide), having a monomeric structure:

and Poly(N-acetamidomethacrylamide), having a monomeric structure:

Water-soluble copolymers including any one or more of the above-described acrylic polymers also are useful in accordance with the principles of the present inventions, including the acrylic interpolymers of polyacrylic acid and poly(methacrylic acid); polyacrylic acid with poly(methacrylamide); and polyacrylic acid with methacrylic acid.

Other suitable water-soluble polymers include polyvinyloxazolidone (PVO) and polyvinylmethyloxazolidone (PVMO), having the monomeric structures:

PVO: R = H
PVMO: R = $CH_3$

Turning now to the drawings, and initially to FIG. 1, one co-extrusion apparatus, generally designated 20, is illustrated in schematic form for co-extruding the clay composition 22 together with a water-penetrable coating layer 24, such as a water-soluble polymer outer coating layer 24 in the form of a rod-, or rope-shape to form the coated article 10. In the preferred embodiment, the water-swellable clay composition 22, comprising an intimate mixture of sodium bentonite or sodium montmorillonite, with polypropene and/or polybutene in one embodiment, or with a plasticizer in another embodiment, is thoroughly blended into a homogeneous blend with an elastomer, such as butyl rubber, blended, for example, in a sigma blender or twin screw extruder (not shown) to fully masticate the elastomer to provide a homogeneous adhesive composition into a feed hopper 25 of one portion 26 of the co-extruder 20. Auger 28 of extruder portion 26 forces the water-swellable clay-containing composition through a die opening 29 in extruder portion 26 to form a rod-, or rope-shaped waterproofing composition 22. At the same time, another integral extruder portion 30 of co-extruder 20 extrudes a water-penetrable, degradable, or water-soluble coating layer 24 over the rod-, or rope-shaped waterproofing composition 22 as a co-extruded coating material.

The rope 10 of water-swellable clay-containing waterproofing composition 22 having a coating of a continuous layer 24 of the water-soluble polymer coating material, is directed on a conveyor through a cooling/drying zone 32 to solidify the coating material 24 and render it non-tacky. In the preferred embodiment, using poly(tetramethylene adipate-co-terephthalate) as the water-penetrable coating layer 24, the rope 10 exits the co-extrusion apparatus 20 at a temperature of about 90–100° C. and is tacky. Upon cooling in cooling chamber 32 to a temperature of about 80° C. or below, the water-penetrable coating layer 24 is fully solidified and becomes non-tacky. The article 10 then proceeds by gravity onto a conveyor, generally designated 40, including an endless conveyor belt 42 driven around rollers 45 and 46 by a conveyor motor 48. The conveyor 40 can be driven at a variety of predetermined speeds by the conveyor motor 48, corresponding to the speed of the co-extruded article 22 emerging from the co-extruder 20. By varying the speed of the conveyor belt 42 relative to the speed at which the co-extruded article 10 exits the die opening 29, the article 10 can be stretched or compressed slightly to vary the cross-sectional thickness of the extruded article 10. In order to prevent premature hydration of the core of water-swellable clay composition 22, the water-swellable clay-containing composition 22 is coated, by co-extrusion, with a desired thickness of a water-penetrable or water-soluble coating material 24 having controlled, predetermined water-penetrability or water-solubility, so that the water-swellable clay-containing composition 22 will not be hydrated during installation of the article, such as by contact with rainwater. The water-swellable clay-containing composition 22 is quickly hydrated after water penetration or removal of the coating material 24, after installation.

The water-swellable clay-containing composition 22 of the preferred embodiment will expand upon water contact while maintaining structural integrity to permanently fill any cracks, fissures or gaps left from improper installation, thereby insuring that the composition 22 self heals to prevent essentially all water penetration to the substrate, e.g., building material, e.g., concrete 44, thereagainst. The articles 10 of the present invention are particularly effective when applied to building materials, such as wood, concrete, rock and the like.

The apparatus of FIG. 1, generally designated 20 is illustrated schematically for forming the multi-layer articles including a water-swellable clay-containing core composition 22, and a co-extruded coating layer 24 of a water-penetrable or water-soluble or biodegradable material, preferably a water-soluble or high pH, e.g., 9$^+$ pH-biodegradable polymer. In the preferred embodiment, the thoroughly blended clay composition 22 is received in the hopper 25 having a discharge opening 34 disposed vertically above the auger 28 of extruder portion 26 to provide the clay composition 22, as a core material of the coated product 10 that can be extruded into any desired thickness and shape.

Figure 2:
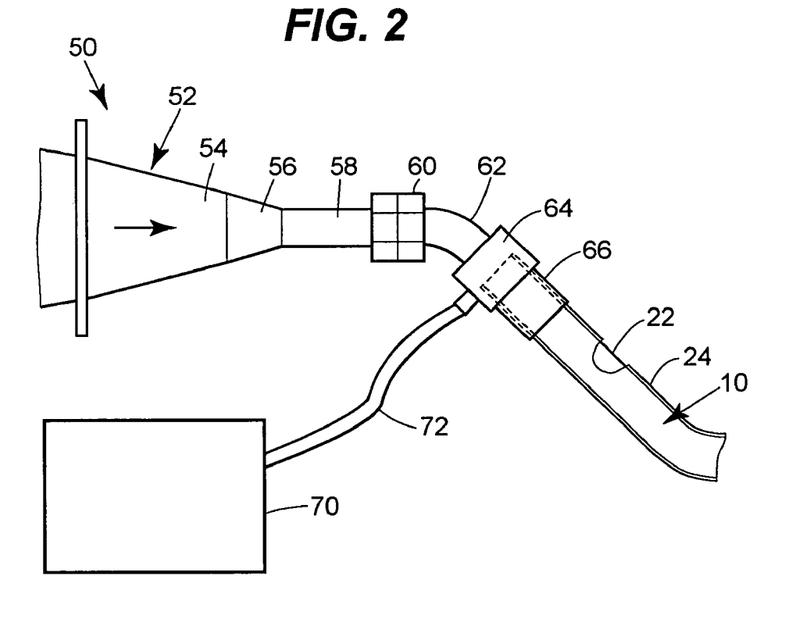
FIG. 2 is a cross-sectional view of another co-extrusion apparatus useful for co-extruding the waterproofing articles of the present invention.
Figure 3:
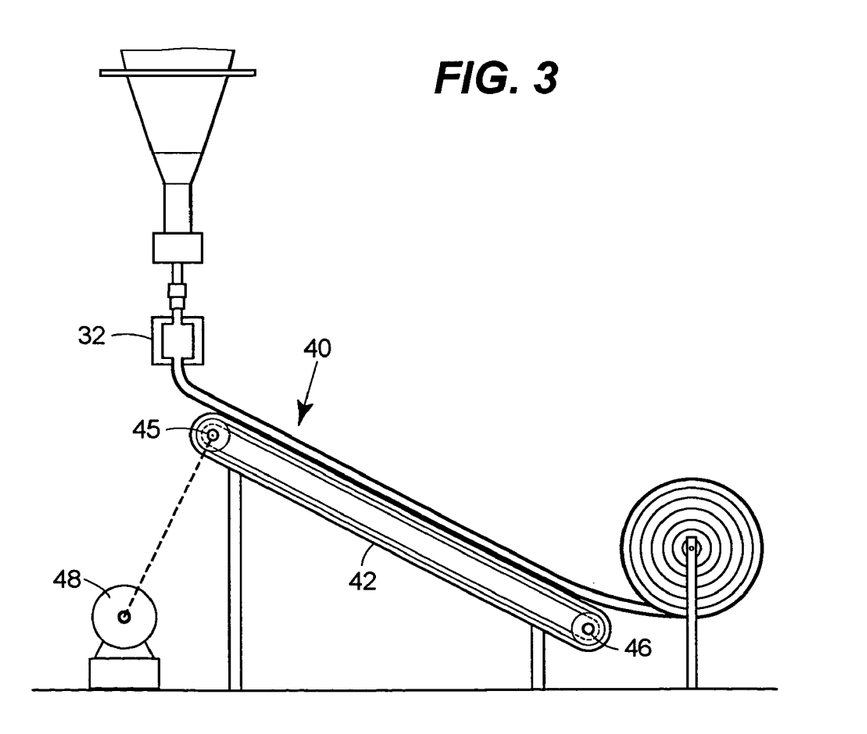
FIG. 3 is a perspective view of apparatus used to coil the rod-shaped articles of the present invention into a coil of material that does not stick to itself and is in an easily handleable form for installation.
Figure 4:
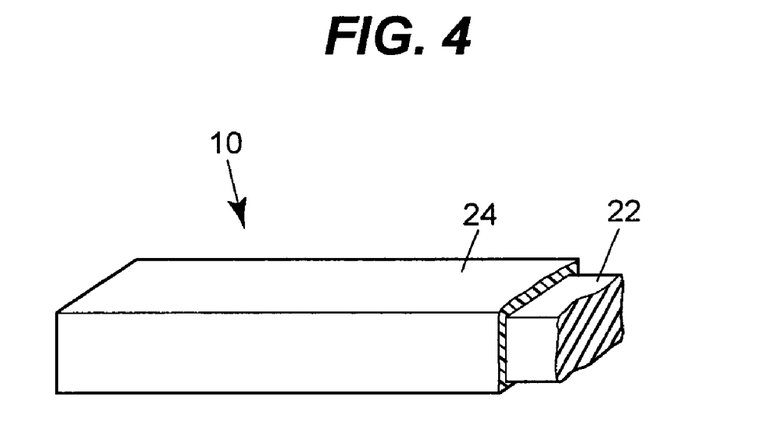
FIG. 4 is a perspective view of a rod-shaped, coated waterproofing article of the present invention.
Figure 5A:
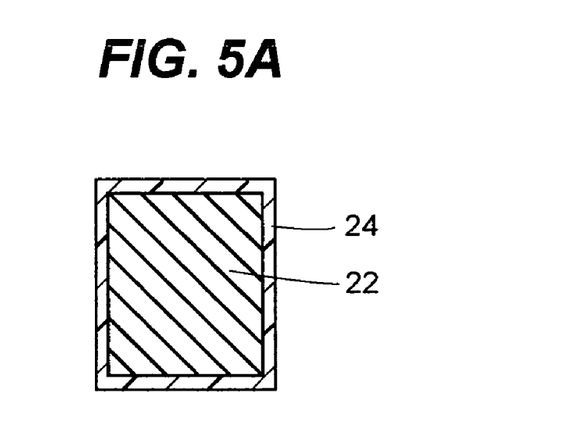
FIG. 5 shows two alternative cross-sectional shapes (rectangular or square and round) for the articles of the present invention.
Figure 5B:
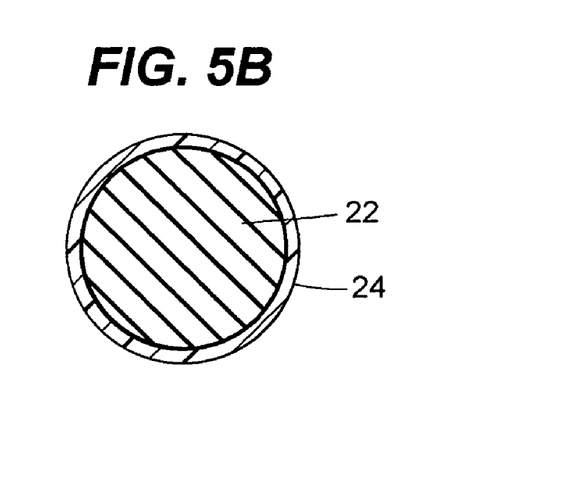

Turning now to FIG. 2, there is schematically shown another apparatus, generally designated 50, for co-extruding the articles 10 of the present invention. As shown in FIG. 2, the water-swellable clay-containing composition 22 is extruded through a reducing bell, generally designated 52 that includes a first reducing portion 54 that reduces the diameter of the clay composition core material 22 from, for example, eight inches to four inches; and another reducing bell portion 56 that reduces the clay composition core material 22 to its final diameter of, for example, two inches. The extruded clay composition core material flows through conduit 58, union 60 and elbow 62 to an overlay conduit or overlay box 64. The overlay conduit 64 surrounds the conduit 62 containing the clay composition core material and includes a coating material output nozzle 66 capable of delivering an outer, coating layer 24 of water-penetrable, degradable or water-soluble material over the water-swellable clay-containing core material 22. The coating material 24 is extruded from a coating material extruder, schematically illustrated at 70, which extrudes a coating material, e.g., a water-soluble polymer melt, through conduit 72 to the overlay conduit 64. The coating material 24 flows through the overlay conduit 64 and through the coating material output nozzle 66 to form a continuous water-protecting layer over the clay material core layer 22.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

What is claimed is:

1. A water barrier, in a shape of a rod or rope, having a length to width ratio of at least 10, adapted to be secured to an area of potential water flow comprising a flexible, water-impermeable, clay-containing composition core having a co-extruded coating layer of a water-penetrable material thereover, said coating layer having a predetermined water-penetration rate to allow for wetting of the coating layer during installation without hydrating the underlying clay.

2. The water barrier of claim 1, wherein the coating is a water-soluble polymer coated continuously over the entire outer surface of the water-impermeable, clay-containing composition.

3. The water barrier of claim 2, wherein the water-soluble polymer is selected from the group consisting of poly(acrylic acid), polyacrylate, poly(methacrylic acid), polymethacrylate, and mixtures thereof.

4. The water barrier of claim 2, wherein the water-soluble polymer has a thickness in the range of about 0.1 mil to about 15 mils.

5. The water barrier of claim 4, wherein the water-soluble polymer has a thickness in the range of about 1 to 3 mils.

6. The water barrier of claim 2, wherein the water-soluble polymer is selected from the group consisting of: poly(vinyl alcohol); poly(vinyl acetate); copolymers of vinyl alcohol and vinyl acetate; polyvinylpyrrolidone; and combinations thereof.

7. The water barrier of claim 1, wherein the coating layer of water-soluble material is co-extruded over the clay composition in an amount of about 1 to about 10 pounds of coating layer per 100 ft$^2$ of core surface area.

8. The water barrier of claim 1, wherein the clay composition comprises about 10% to about 90% by weight clay and a material selected from the group consisting of polypropene, polybutene, and mixtures thereof in an amount of about 8% to about 65% by weight.

9. The water barrier of claim 8, wherein the clay composition further includes an elastomer in an amount of about 1% to about 20% by weight.

10. The water barrier of claim 8, wherein the clay is a smectite clay.

11. The water barrier of claim 10, wherein the smectite clay is selected from the group consisting of sodium bentonite, sodium montmorillonite, calcium bentonite, calcium montmorillonite, magnesium bentonite, magnesium montmorillonite, iron bentonite, iron montmorillonite, beidellite, nontronite, hectorite, saponite, sepiolite, and combinations thereof.

12. The water barrier of claim 8, wherein the coating layer is selected from the group consisting of guar, arabic, ghatti, tragacanth, agar, xanthan, karaya, locust bean, acacia, carrageenan, silicone gum, hydroxyethylcellulose, hydroxypropylcellulose, hydroxybutylcellulose, carboxymethylcellulose, sodium carboxymethylcellulose, gelatin, starch, modified starch, nonoxynol, oxtoxynol, ethoxylated fatty alcohol, propoxylated fatty alcohol, ethoxylated fatty acid, propoxylated fatty acid, ethoxylated fatty amine, propoxylated fatty amine, and mixtures thereof.

13. The water barrier of claim 8, wherein the coating layer is a biodegradable polymer.

14. The coating layer of claim 8, wherein the coating layer is a polymer that degrades at a pH above 9.

15. The water barrier of claim 1, wherein the water-penetrable coating layer is poly(tetramethylene adipate-co-terephthalate).

16. A method of manufacturing a water barrier in a shape of a rod or rope, having a length to width ratio of at least 10, comprising extruding a core of a clay-containing composition and co-extruding an outer coating layer of a water-penetrable material thereover, said coating preventing water from contacting the core composition during installation and removable by water contact after installation.

17. The method of claim 16, wherein the coating is a water-penetrable polymer coated continuously over the entire outer surface of the water-impermeable, water-swellable clay-containing composition.

18. The method of claim 17, wherein the water-penetrable material is a water-soluble polymer.

19. The method of claim 18, wherein the water-soluble polymer is selected from the group consisting of poly(acrylic acid), a metal salt of poly(acrylic acid), poly(methacrylic acid), a metal salt of poly(methacrylic acid), and mixtures there.

20. The method of claim 16, wherein the water-penetrable material has a thickness in the range of about 0.1 mil to about 15 mils.

21. The method of claim 20, wherein the water-penetrable material has a thickness in the range of about 1 mil to about 3 mils.

22. The method of claim 21, wherein the coating layer is poly(tetramethylene adipate-co-terephthalate).

23. The method of claim 18, wherein the water-soluble polymer is selected from the group consisting of poly(acrylic acid), polyacrylate, poly(methacrylic acid), polymethacrylate, and mixtures thereof.

24. The method of claim 16, wherein the clay composition comprises about 35% to about 90% by weight of a smectite clay and a material selected from the group consisting of polypropene polybutene, and mixtures thereof in an amount of about 10% to about 65% by weight.

25. The method of claim 16, further including the steps of cooling or drying the coating layer sufficiently to render the coating layer non-tacky, and coiling the dried water-barrier into a coil of water-barrier material.

26. The method of claim 25, wherein the water barrier material is not in contact with a release sheet of material.

27. The method of claim 24 further including intercalating the polybutene or polypropene between adjacent clay platelets to exfoliate at least a portion of the clay into individual clay platelets.

* * * * *